April 18, 1944.   W. A. SHURCLIFF   2,347,066
SPECTROPHOTOMETER ACCESSORY
Filed Feb. 13, 1942
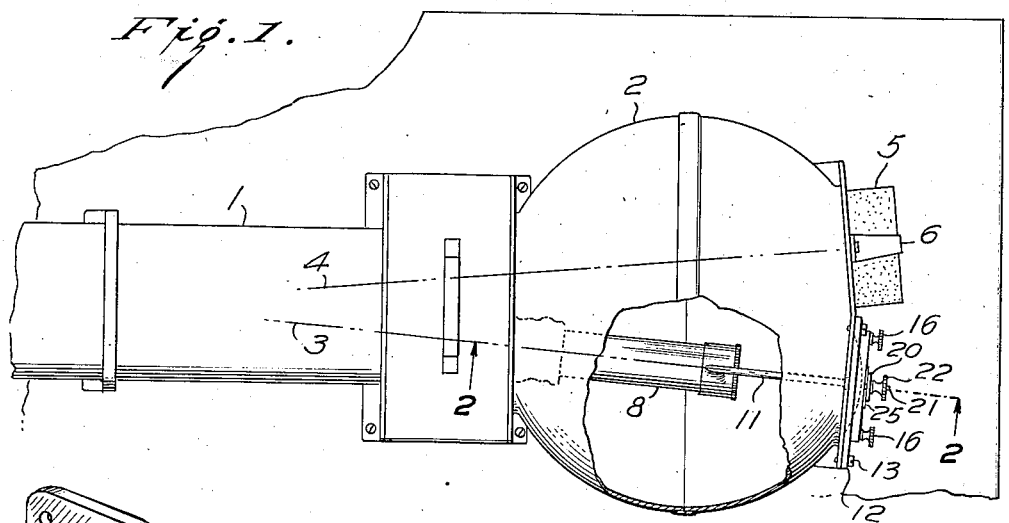
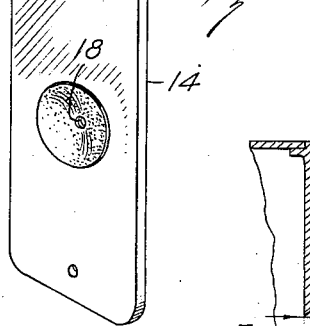
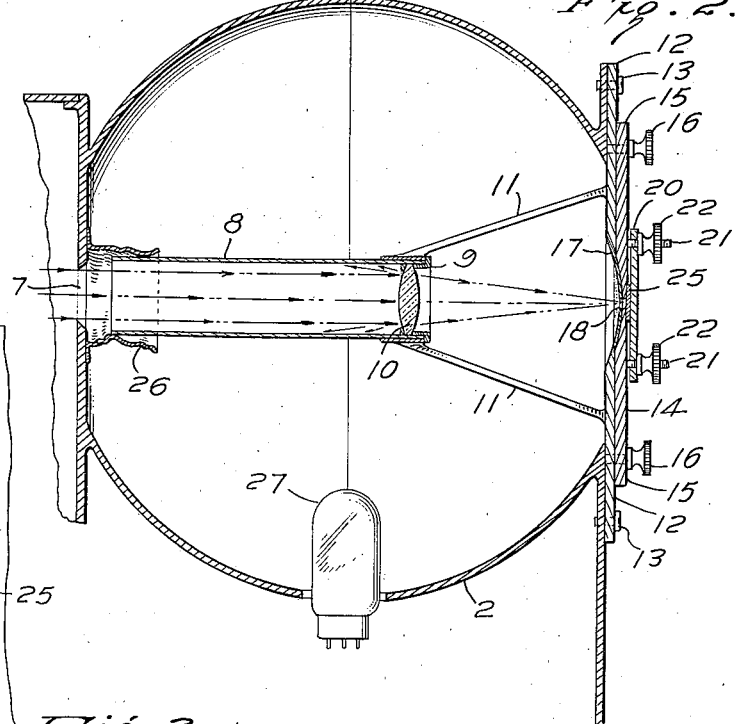
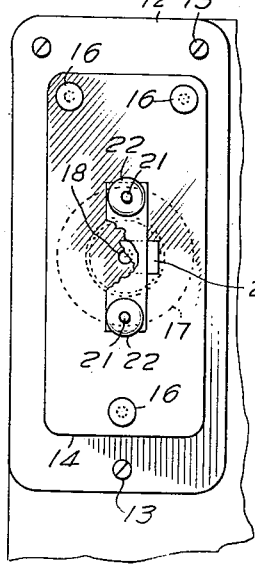
INVENTOR.
WILLIAM A. SHURCLIFF,
BY Elmer W. Harmon
ATTORNEY.

Patented Apr. 18, 1944

2,347,066

UNITED STATES PATENT OFFICE 2,347,066

SPECTROPHOTOMETER ACCESSORY

William A. Shurcliff, Plainfield, N. J., assignor to American Cyanamid Company, New York, N. Y., a corporation of Maine Application February 13, 1942, Serial No. 430,719

5 Claims. (Cl. 88—14)

This invention relates to the means for supporting and illuminating samples for spectrophotometric measurements of reflectance particularly with respect to the measurement of reflectance from very small samples.

In the past considerable information concerning the properties of various materials has been obtainable through the use of flickering-beam type spectrophotometers. Examples of such spectrophotometers are well illustrated in U. S. Letters Patent No. 2,107,836 and 2,126,410 issued on February 8, 1938, and August 9, 1938, respectively, to Orrin W. Pineo. However, even the best of such spectrophotometers may not be used to measure the reflectance of very small samples having an area of from about 1 to 2 sq. mm. It often becomes desirable to obtain data on such small samples; for example in the cases where the problem is to obtain the color of a single thread in a tweed mixture or the color of a small polka dot or where only a small clipping of a particular sample is available or where it is desired to investigate the nature of some foreign body on a sample. Another useful application is in the measurement of the uniformity of dyeing in the various portions of a large sample.

In general the present invention relates to an attachment for mounting and illuminating such small samples of material so that they may be examined in the conventional flicker type spectrophotometer. The apparatus comprises essentially a condensing lens for concentrating the beam of light upon the sample, a mounting for the lens and a means for removably mounting the sample.

The invention will be described in greater detail in conjunction with the drawing in which:

Figure 1 is a plan view partially broken away showing the integrating sphere, lens mount and reflectance sample mountings;

Figure 2 is a slightly enlarged section along the line 2—2 of Figure 1, showing the optical magnifier and sample mounting means in place;

Figure 3 is a detailed elevation of the sample holder and sample holder mounting;

Figure 4 is a perspective view of the sample holder mounting plate of Figure 3.

Referring to Figure 1, 1 represents the integrating sphere end of a flickering-beam type spectrophotometer having an integrating sphere 2 and means for passing two divergent light beams, represented by lines 3 and 4, of approximately equal cross section and intensity into the integrating sphere from some suitable source. The source of these beams does not form any part of the present invention, is conventional and is not shown. The reference beam 4 passes directly through the integrating sphere and is received upon a reference sample 5, which may be a block of magnesium carbonate or the like, mounted externally upon the sphere by some means such as the spring clip 6.

As best shown in Figure 2, the sample beam 3 enters the integrator sphere through window 7 and passes into a tube 8 which contains a lens-holder 9 and the lens 10. The tube is supported by suitable braces 11 on the plate 12 which is attached to the integrating sphere by suitable means such as screws 13. Removably mounted on the plate 12 is a mounting plate 14 positioned by pins 15 and held in place by suitable means such as the nuts 16. The plate 12 has a tapered opening 17 forming an exact connection with a similar tapered opening 18 in plate 14 when the latter is in place. The focal length of lens 10 is so selected that light passing through the lens will be sharply focused upon the opening 18. A bar 20 is detachably mounted upon plate 14 by some suitable means such as the screws 21 and nuts 22 so that bar 20 will hold sample 25 exactly over the opening 18. A suitable sleeve 26 of a flexible light-absorbing material such as black velvet is provided to close the gap between the window 7 and the tube 8.

By this arrangement the beam represented by line 4 falls directly upon the standard 5 and is diffusely reflected therefrom into the interior of the integrating sphere and is picked up by photocell 27. The beam of light represented by line 3 enters the tube 8 and by means of the condensing lens 10 is concentrated upon the small sample 25, from which part of the light is diffusely reflected into the interior of the sphere and also picked up by the photocell. The operation of the spectrophotometer to equalize the amount of light reflected from both samples and make the recording is conventional.

A certain amount of the light energy entering the tube 8 is reflected from the surface of lens 10 and if it were not for the tube or conduit 8 would also be picked up by the interior wall of the integrator sphere and cause an erroneous reading. It is therefore necessary that the conduit 8 be adapted to prevent any light so reflected from being picked up by the photocell. This may be done by extending the conduit out through the window 7 or by providing some light absorbing connector such as the sleeve 26 which may be of black velvet or the like. Since part of the light reflected from the lens will fall on the inner surface of the conduit, I have found it desirable to coat the inner surface of the tube with some material capable of absorbing this fraction although it is not absolutely necessary to do so.

If any light after passing through the lens accidentally falls outside the limits of the opening 18, it will be reflected from the surface of the plate 14 and cause an erroneous reading. The light falling around opening 18 may be augmented by a certain amount of secondarily reflected light from the rear surface of the lens 10. To eliminate the effect of such error from these light sources the concave surface adjacent the opening 18 is also covered with a light absorbing coating.

In order that a correct reading be given by the instrument it is necessary that, for a photometer setting of 100%, the same amount of light energy be received upon both the standard sample and the sample being tested. Since a certain amount of light which would normally fall upon the sample being tested is lost due to reflection from and absorption by the lens, it is necessary to compensate therefor by reducing the relative intensity of the beam falling upon the standard sample. Any suitable attenuating device for the standard beam may be used, as for example a neutral filter. Another method of balancing the two beams is to place a similar optical system in the path of each. This is particularly advantageous in some cases since it permits the direct comparison of two small samples with each other.

The apparatus of the present invention comprises several important features. It provides an assembly which may be readily installed in or removed from a conventional spectrophotometer without modifying the structure of the latter. It provides a properly positioned lens of the correct size and focal length and at the same time provides a rejector conduit whereby the effect of any light specularly reflected from the lens is eliminated and thereby the reading of the apparatus particularly at low reflectance values will not be in error. It provides a sample holder having properly coated areas so as to eliminate errors due to scattered light. It provides means so that the position of the sample can be reproduced since the position of the sample holder is fixed by the mounting pins.

It also embodies a further important feature in that the sample holder bar 20 may be removed and thereby the focus of the light beam may be checked to insure that the latter falls directly upon the small sample. This is important since with the light beam concentrated on a small area a small error in positioning the sample with respect to the light can produce a very sizeable error in the reflectance measurement.

The condensing lens system of the present invention permits utilizing the major portion of the light of the standard and sample beams. Thus the spectrophotometer may be operated with substantially the same range as an ordinary instrument measuring large areas. If it were attempted to modify an ordinary instrument by providing masks with small holes to expose only a small area of sample or standard, the light reflected into the integrating sphere would be greatly decreased and measurements would be possible only with fairly large holes and very light samples. It is also impossible to completely absorb light by any kind of a mask and with a small opening any minute non-uniformity of reflectance of the masks would introduce serious error.

Various modifications of the apparatus may be made within the scope of the present invention, for example, the lens may be of an achromatic or anastigmatic or other special type, although it is an advantage of the invention that satisfactory results may be obtained with a relatively cheap condensing lens. The mounting means for the sample holder may also be modified by using spring clips and the like instead of screws where speed of change is more important than extreme accuracy of alignment.

It is an important advantage of the invention that no major changes are made in the flickering beam spectrophotometer since the condensing lens and sample mounting system of the present invention can be inserted in the standard spectophotometer without any change other than adjustment of the intensity of the standard beam to compensate for light loss through the condensing lens system. It is thus possible through the present invention to use a single flickering-beam spectrophotometer for both large areas and very small areas, the measurement of which forms one of the principal objects of the present invention.

While the discussion has been limited to an integrating sphere it is not essential that this integrating "chamber" be a true sphere. The use of a "chamber" or "head" other than spherical is feasible so long as both halves of the chamber are symmetrical. If the symmetry is lacking the readings will be in error. As nearly a true sphere as is practical is desirable since a true sphere permits the photocell to pick up the greatest possible amount of light.

I claim:

1. A sample holder adapted for use with those spectrophotometers of the flickering-beam type which have an integrating sphere with at least one opening therein for the admission of light into the sphere and a sample mounting window opposite said opening, which comprises a substantially flat plate having a concave depression in one surface of the plate, a small opening through said plate at the bottom of said depression, a light absorbing lining on said depression, the opposite face of said plate comprising a substantially flat plane, and means mounted on said flat face for positioning a sample in fixed relation to said small opening and substantially in the plane of the flat face of the plate.

2. In a spectrophotometer of the flickering-beam type, the combination of an integrating sphere having at least one opening for the admission of light into the sphere, means for introducing a beam of substantially paraxial light into the sphere through said opening and a large opening opposite said light-admitting opening with a flat plate mounted in and substantially closing said large opening; a window in said plate; means mounted on said plate externally of the sphere for holding a sample substantially in a flat position in a fixed relation to said window; a lens-mounting means in the interior of the sphere intermediate said window and said light-admitting opening, said lens-mounting means being supported by and attached to said plate by rigid rods; a convergent lens in said lens-mounting means, optically aligned with said light-admitting opening and said window and having a focal length such that the beam of substantially paraxial light after passing through the lens is focused at a point substantially in the plane of said sample-holding means; a conduit, supported by said rigid rods, enclosing said lens and extending from said lens-mounting means substantially to said light-admitting opening and a light-absorbing lining in said conduit.

3. An apparatus according to claim 2 in which a flexible light-absorbing means connects the conduit and the light-admitting opening, whereby incidental stray light is prevented from entering said sphere outside said conduit.

4. An apparatus according to claim 2 in which the sample holding means is detachably mounted on said plate and means are provided for fixing the position of the sample mounting means with respect to said window.

5. An apparatus according to claim 2 in which the window has beveled edges and the sample mounting means comprises a second plate, having a concave depression in one surface thereof which extends the bevel of said window edges to a small opening through said second plate at the bottom of the depression, the opposite surface of said second plate being substantially flat; a light absorbing lining in said depression; means for mounting said second plate on said flat plate in fixed relation therewith and means mounted on the flat surface of said second plate for positioning a sample in fixed relation to said small opening and substantially in the plane of the flat surface of said second plate.

WILLIAM A. SHURCLIFF.